United States Patent [19]

Lawrence et al.

[11] 3,998,978
[45] Dec. 21, 1976

[54] CORRUGATED CEREAL FLAKES

[75] Inventors: Norman F. Lawrence; Stanley H. Reesman, both of Battle Creek, Mich.

[73] Assignee: General Foods Corporation, White Plains, N.Y.

[22] Filed: May 28, 1975

[21] Appl. No.: 581,466

[52] U.S. Cl. ............................. 426/285; 426/457; 426/468; 426/621

[51] Int. Cl.² .......................................... A23L 1/10

[58] Field of Search .......... 426/457, 621, 285, 468, 426/625, 619, 620, 458, 466, 467, 510, 388, 509, 440

[56] References Cited

UNITED STATES PATENTS

| 1,364,634 | 1/1921 | Lippen | 426/457 X |
| 1,430,670 | 10/1922 | Morgan et al. | 426/468 X |
| 1,945,946 | 2/1934 | McKay | 426/621 |
| 3,505,076 | 4/1970 | Maloney et al. | 426/621 X |
| 3,845,232 | 10/1974 | Reesman | 425/457 |
| 3,887,714 | 6/1975 | Kelly et al. | 426/619 |

OTHER PUBLICATIONS

Houston; Rice Chemistry & Technology; American Ass'n of Cereal Chemists, Inc., St. Paul, Minn.; 5/1973; pp. 400, 401, 403.

Primary Examiner—S. Leon Bashore
Assistant Examiner—Kenneth M. Schor
Attorney, Agent, or Firm—Bruno P. Struzzi; Michael J. Quillinan; Mitchell D. Bittman

[57] ABSTRACT

This invention relates to producing a multi-textured flake cereal by the two-step cooking of various grains followed by a flaking and corrugation of the grain pieces whereby a ribbed structure is afforded having a multiplicity of textures, the grain being particularly characterized by the addition of rice as part of a secondary cook.

6 Claims, No Drawings

CORRUGATED CEREAL FLAKES

INTRODUCTION

This invention relates to a process for the production of a unique multi-grain flake cereal texture as well as the product of that process.

BACKGROUND OF THE INVENTION

In recent U.S. Pat. No. 3,845,232 issued Oct. 29, 1974 to Stanley H. Reesman for A METHOD FOR MAKING FLAKED CEREALS a process is described whereby a cereal is corrugated to provide a distinctive ribbed structure. The object of that invention is to so lessen the dimensional thickness of the ribbed cereal flake that it will disintegrate upon being wetted in milk and will offer the pleasing and novel eating texture suggestive of shredded wheat. Thus, it is visualized that the thin portion intermediate the thicker rib-forming portions of the flake disintegrate in milk upon being wetted whereas the thicker flake portions remain desirably intact offering the distinctive grain contributions of the particular cereal.

It is an object of this invention to provide a unique-appearing textured multi-grain flake cereal of the type set forth in said Reesman patent, the texture being afforded by the contributions not only of corn and wheat and like grains, but also rice. In offering a contrasting texture, it is also desirable to offer a contrasting color highly suggestive of a unique cereal value to the consumer. Rice offers this contrast. Unfortunately, when inclusion of rice is attempted in the manufacture of such a corrugated flake, the rice tends to disintegrate.

Through such integration, also, the distinctive grain characteristic contributions of such cereals as corn and wheat may be lessened by having the rice present therewith. Other more particular advantages and objects of this invention will become apparent as the details thereof are described herein.

STATEMENT OF THE INVENTION

In accordance with this invention, a finely blistered flake cereal product having a multi-grain texture such as that contributed by corn and/or wheat in combination with rice is provided by partially cooking those grains such as corn grits, whole wheat grain or the like and thereafter adding a minor quantity of rice, such as pearled white rice or even brown rice, for example at a level of 5 – 45% by weight of the total raw grain charge, and completing the cooking operation until the grains are all substantially gelatinized but heterogenously aggregated as part of a mass wherein the grains substantially adhere to one another.

Thereafter, this mass is cooled and dried to for example 14 – 22% moisture and preferably tempered for at least one hour preparatory to sizing to the intended cereal piece for shredding. Thereupon the piece is passed through a shredding roll which converts it into a corrugated or ribbed flake having a thickness in the order of 0.020 – 0.040 inches and a membrane thickness of 0.005 – 0.015 inches. It will be understood that this corrugated structure will have much of the functionality of the Reesman corrugated flake aforesaid and will be processed in much the similar manner, although the spacing between the corrugating rolls may be wider than is set forth in said patent.

Following such corrugation, the flakes may be toasted in a conventional manner or they may be partially dried, for example to a moisture content of 8 – 14% whereupon they are puff-toasted in a fluidizing bed unit or otherwise treated to provide a puffed, crisp blistered texture. The flakes will be curled and twisted and have a uniform distribution of blisters as well as a cell structure having a novel contrasting eating texture as well as appearance by reason of the discrete presence of the rice as well as the non-rice components, i.e. the corn and/or the wheat. Although corn and wheat combination are preferably employed for contrasting eating textures and flavors which are thought to have appeal to adults, other cereal grains such as rye, barley, and triticale may be employed in whole or partial substitution for corn or wheat which separately and in combination are considered primary cereal grains for use in this invention. Whereas pearled rice is preferred, any other form of milled white rice may be employed such as par-boiled or broken head rice.

BEST MODE

A multi-textured cereal was prepared from the following ingredients:

| Ingredients | Levels | |
|---|---|---|
| Corn grits, thru 5 on 8 screen | 15.00 | lbs. |
| Cleaned white wheat | 15.00 | " |
| Pearl rice | 15.00 | " |
| Sugar | 4.50 | " |
| Salt | 1.35 | " |
| Malt syrup | .45 | " |
| Water | 17.93 | ' |

PROCEDURE

Water, sugar, salt and malt syrup were mixed and heated to 150° F. The syrup was then mixed with the wheat and corn in a pre-heated small rotary cooker for 30 minutes at atmospheric pressure. After complete mixing the charge was then cooked by turning on steam at 15 psig, the cooking procedure lasting 45 minutes whereby the wheat and corn are partially cooked.

At this point, the pearled rice was added to the cooked mixture and a finish cooking was employed at the same steam pressure for an additional 30 minutes. By the end of this period, all of the free water had been absorbed by the grains. The cooker was opened to the atmosphere and cooled by air with three revolutions of the rotary cooker used to promote cooling to a slightly warm condition below 150° F.

The cool charge was then dumped from the cooker and 25 pounds thereof was tray-dried at 200° F in a gas fired cabinet Dryer for 11 – 14 minutes to a weight of 20 – 21 pounds, the charge material being broken at the mid point of the drying operation to assure uniform drying. The charge material was then cooled and tempered overnight to room temperature, tempering to at least four hours being most preferred in order to assure moisture equilibration for flaking and corrugation purposes. The charge material was then sized through a ¼ inch screen, screen size being dependent upon the finished size of the desired flake. The sized cereal pieces were then heated by exposure to a draft of warm air at 225° F for 2½ –4 minutes to dry to a moisture content of about 20%. The plastic pieces were thereafter corrugated by passing through corrugating rolls to produce a shred thickness of 0.025 to 0.036 and intermediate connecting membranes of 0.008 to 0.015 inches thickness.

The corrugated flakes were thereafter dried to a moisture of 8 – 14% and fluidized bed toasted with a fluidizing air at 400° F to dry the product to a 2% moisture content. This fluidizing treatment is operative to puff and toast the cereal pieces and produce a contrasting appearance with yellow, cream white and brown colors respectively contributed by the corn, rice and wheat. The flakes are curled and twisted having uniform blisters and cell structures which offer a crisp distinctive eating quality to the grain when consumed. In this regard, it is desirable to control the toasting so that it is not so protracted as to lose the contrasting appearance. In general, the product should not be dried to a moisture content less than 1.5%; drying to a moisture content of 1.5 – 3.5% will be referred. In lieu of puff toasting, the corrugated flake may be simply oven-toasted by subjecting it to a conventional drying and toasting at 350° – 450° F, for example about 400°0 F to a like moisture content. The product thus produced will not be as puffed or blistered, but will nevertheless have the evidenced yellow, cream white and brown colors wherein distinctive grain contributions of each of the grains will be apparent to the consumer and the flavor values thereof will likewise be identified.

What is claimed is:

1. Process of producing a multi-textured flaked cereal which comprises partially cooking a first cereal charge from which rice is absent, then adding to the first charge a charge of rice at a level of 5 – 45% by weight of the total raw grain charge, further cooking the combined charges until the grains thereof are substantially gelatinized but heterogeneously aggregated and substantially adhere to one another, thereafter cooling, partially drying and corrugating the aggregate in the form of a thin flake comprising ribs and thinner intermediate connected membranes, and toasting the corrugated flake.

2. Process of claim 1 wherein the flake ribs have a thickness in the order of 0.020 – 0.040 inches and a connecting membrane thickness in the order of 0.005 – 0.015 inches.

3. Process of claim 2 wherein the first charge comprises corn or wheat or mixtures thereof.

4. Process of claim 3 wherein the corrugated flakes are dried to 8 – 14% moisture and toasted in a hot gaseous fluidizing medium to 1.5 – 3.5% moisture.

5. Process of claim 1 wherein the aggregates are dried to 14 – 22% moisture and tempered at least one hour prior to corrugation.

6. Product of the process of claim 1.

* * * * *